(12) United States Patent
Minko

(10) Patent No.: US 8,613,790 B2
(45) Date of Patent: Dec. 24, 2013

(54) LANCE FOR INJECTING SOLID MATERIAL INTO A VESSEL

(75) Inventor: Bronislaw Jerzy Minko, Mt. Pleasant (AU)

(73) Assignee: Technological Resources Pty Limited, Melbourne, Victoria (AU)

( * ) Notice: Subject to any disclaimer, the term of this patent is extended or adjusted under 35 U.S.C. 154(b) by 223 days.

(21) Appl. No.: 12/665,190

(22) PCT Filed: Jun. 19, 2008

(86) PCT No.: PCT/AU2008/000888
§ 371 (c)(1),
(2), (4) Date: Oct. 6, 2010

(87) PCT Pub. No.: WO2008/154689
PCT Pub. Date: Dec. 24, 2008

(65) Prior Publication Data
US 2011/0017021 A1 Jan. 27, 2011

(30) Foreign Application Priority Data
Jun. 19, 2007 (AU) ................................ 2007903287

(51) Int. Cl.
*C21C 7/04* (2006.01)
(52) U.S. Cl.
USPC .............. 75/560; 266/215; 266/225; 266/270
(58) Field of Classification Search
USPC ............................. 266/216, 225, 270; 75/560
See application file for complete search history.

(56) References Cited

U.S. PATENT DOCUMENTS

| 1,944,178 | A | * | 1/1934 | Homerberg | 148/318 |
| 2,016,674 | A | * | 10/1935 | Hamasumi | 138/142 |
| 4,239,194 | A | | 12/1980 | Debaise | |
| 6,245,285 | B1 | * | 6/2001 | Dry et al. | 266/222 |
| 6,398,842 | B2 | * | 6/2002 | Dunne | 266/225 |
| 6,605,371 | B1 | * | 8/2003 | Ueda et al. | 428/679 |
| 8,003,044 | B2 | * | 8/2011 | Williams et al. | 266/225 |

FOREIGN PATENT DOCUMENTS

| CA | 853116 A | 10/1970 |
| GB | 2 028 987 A | 3/1980 |
| SU | 735640 A | 5/1980 |
| WO | WO 96/31627 | 10/1996 |
| WO | WO 2006/042363 A1 | 4/2006 |

OTHER PUBLICATIONS

International Search Report from the Australia Patent Office in International Application No. PCT/AU2008/000888 mailed Jul. 16, 2008.
International Preliminary Report on Patentability in International Application No. PCT/AU2008/000888 issued Dec. 22, 2009 (6 pages).

* cited by examiner

*Primary Examiner* — George Wyszomierski
*Assistant Examiner* — Tima M McGuthry Banks
(74) *Attorney, Agent, or Firm* — Banner & Witcoff, Ltd.

(57) ABSTRACT

A lance for injecting a solid material into a vessel, such as a direct smelting vessel for producing molten iron, has a core tube assembly comprising a passageway for solid material. The core tube assembly has an inlet for receiving solid material at a rear end and an outlet for discharging material at a forward end. The core tube assembly comprises an outer tube of a structural material and an inner tube of a wear resistant material that are bonded together. A method of manufacturing the core tube assembly may include spin casting the outer tube of the structural material; spin casting the inner tube of the wear resistant material onto the inner surface of the outer tube; and metallurgically bonding the tubes together.

28 Claims, 3 Drawing Sheets

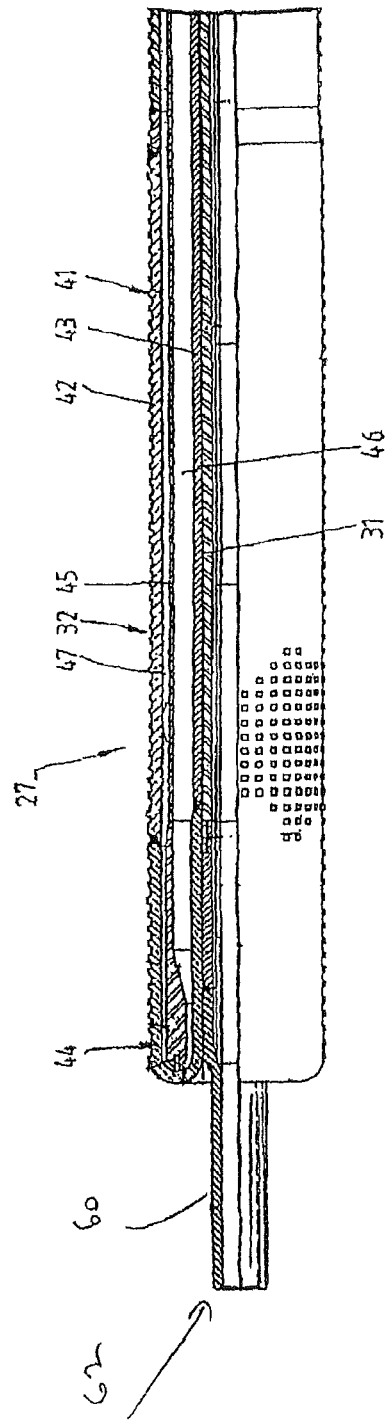

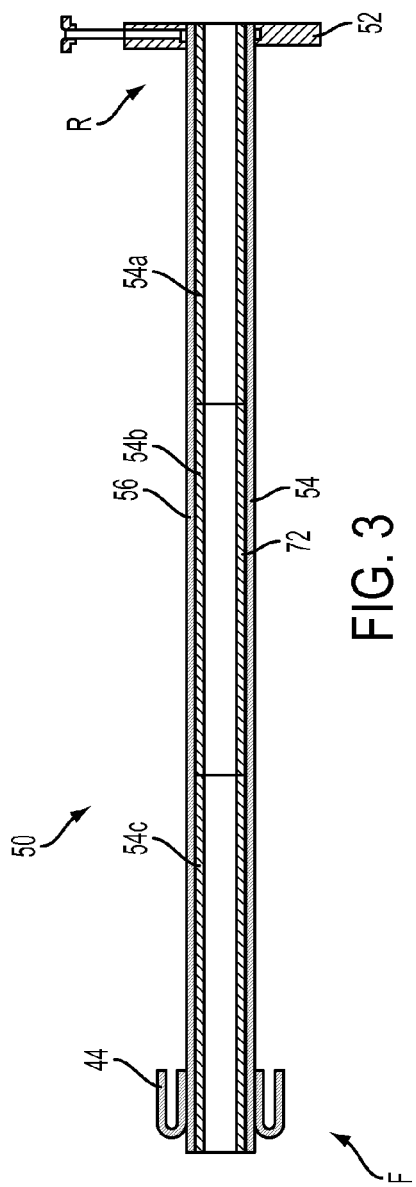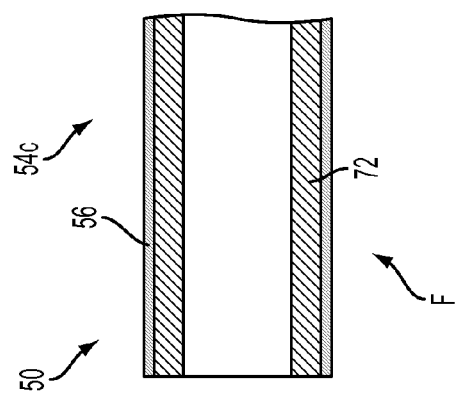

LANCE FOR INJECTING SOLID MATERIAL INTO A VESSEL

CROSS REFERENCE TO RELATED APPLICATIONS

This application is a National Phase application based on PCT/AU2008/000888 filed on Jun. 19, 2008, the contents of which are incorporated herein by reference and claims the priority of Australian Application No. 2,007,903,287, filed on Jun. 19, 2007, the contents of which are incorporated herein by reference.

FIELD OF THE INVENTION

The present invention relates to a lance for injecting solid material into a vessel, such as a direct smelting vessel for producing molten iron.

BACKGROUND

A known direct smelting process, which relies principally on a molten bath as a reaction medium, and is generally referred to as the HIsmelt process, is described in International application PCT/AU96/00197 (WO 96/31627) in the name of the applicant.

The HIsmelt process as described in the International application in the context of producing molten iron includes:
(a) forming a bath of molten iron and slag in a vessel;
(b) injecting into the bath:
(i) a metalliferous material, typically iron oxides; and
(ii) a solid carbonaceous material, typically coal, which acts as a reductant of the iron oxides and a source of energy; and
(c) smelting metalliferous material to iron in the molten bath.

The term "smelting" is herein understood to mean thermal processing wherein chemical reactions that reduce metal oxides take place to produce molten metal.

The HIsmelt process also includes post-combusting reaction gases, such as CO and $H_2$ released from the bath, in the space above the bath with oxygen-containing gas and transferring the heat generated by the post-combustion to the bath to contribute to the thermal energy required to smelt the metalliferous materials.

The HIsmelt process also includes forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous material and solid carbonaceous material is injected into the molten bath through a number of lances/tuyeres which are inclined to the vertical so as to extend downwardly and inwardly through the side wall of the smelting vessel and into a lower region of the vessel so as to deliver at least part of the solids material into the metal layer in the bottom of the vessel. To promote the post-combustion of reaction gases in the upper part of the vessel, a blast of hot air, which may be oxygen enriched, is injected into an upper region of the vessel through a downwardly extending hot air injection lance. Off gases resulting from the post-combustion of reaction gases in the vessel are taken away from the upper part of the vessel through an off gas duct. The vessel includes refractory-lined water cooled panels in the side wall and the roof of the vessel, and water is circulated continuously through the panels in a continuous circuit.

The HIsmelt process enables large quantities of molten iron to be produced by direct smelting of metalliferous material. To enable such levels of production, large quantities of both metalliferous material and carbonaceous material must be supplied to the vessel.

One example of the construction of a solids injection lance for use in a direct smelting vessel can be found in U.S. Pat. No. 6,398,842 (assigned to the present applicant). This form of lance can be used to inject solid particulate material, such as metalliferous material or carbonaceous material, into the direct smelting vessel. In that construction, the solid particulate material is passed through a central core tube which is fitted closely within an outer annular cooling jacket. A forced internal cooling water system is provided within the outer annular cooling jacket to allow the lance to operate successfully when exposed to the high temperatures encountered within a direct smelting vessel, which can be in excess of 1400° C.

Metalliferous material and carbonaceous material can be particularly abrasive. When the direct smelting vessel is used to produce molten iron, typically the metalliferous material comprises iron ore fines. It is desirable that the components of the direct smelting plant can withstand exposure to these abrasive materials over a smelting campaign, which can be 12 months or longer.

The present invention provides an effective and reliable solids injection lance for the injection of metalliferous material and/or carbonaceous material into a direct smelting vessel.

SUMMARY OF THE INVENTION

The present invention provides a lance for injecting a solid material into a vessel, such as a direct smelting vessel for producing molten iron, the lance having a core tube assembly comprising a passageway for solid material, the core tube assembly having an inlet for receiving solid material at a rear end and an outlet for discharging material at a forward end, the core tube assembly comprising an outer tube of a structural material and an inner tube of a wear resistant material that are bonded together.

Constructing the core tube assembly of the lance with the outer tube of a structural material and the inner tube of a wear resistant material optimises the quite separate requirements for the core tube assembly, particularly in situations where the lance is relatively long (i.e. at least 4 m) and is used to inject hot (i.e. greater than 600° C.), abrasive materials. In addition, bonding the inner and the outer tubes together is particularly advantageous in situations where the core tube assembly comprises a number of axially aligned sections that have to be secured together. By way of explanation, it is often the case that wear resistant materials, such as ferrochromium white cast iron, are difficult to weld reliably and, hence, there is a real risk that welds connecting together adjacent sections of a wear resistant material may fail prematurely, and ultimately lead to failure of the lance. Bonding the inner tube and the outer tube together provides an opportunity to avoid this issue. Moreover, where a core tube assembly comprises a plurality of sections, the outer tube provides an opportunity to minimise any risks of failure of the lance even in situations where the inner tube is segmented rather than a continuous tube because, typically, structural materials that are suitable for use for the outer tube can be welded together with a high degree of weld integrity. In addition, the bonding between the outer tube and the inner tube can extend at least substantially across the whole of the surface area of the interface between the two tubes and thereby provide resistance to shear forces experienced by such tubes arising from pneumatic conveying of materials through the passageway of the core tube assembly into the vessel.

Preferably the outer tube is formed from a steel, more preferably a stainless steel.

Preferably the outer tube is at least 3 mm thick.

Preferably the thickness of the outer tube is in the range of 3 mm to 15 mm and more preferably in the range of 3 mm to 10 mm.

Preferably the inner tube is formed from a white cast iron, more preferably a ferrochromium white cast iron.

Preferably the white cast iron or ferrochromium white cast iron is at least 3 mm thick and more preferably at least 5 mm thick.

Preferably the white cast iron or ferrochromium white cast iron has a thickness in the range of 3 mm to 40 mm, more preferably 3 mm to 25 mm.

Preferably the bond between the outer tube and the inner tube extends at least substantially across the whole of the surface area of the interface between the two tubes.

Preferably the bond between the outer tube and the inner tube is a metallurgical bond.

Preferably the metallurgical bond is formed by casting the inner tube onto an inner surface of the outer tube.

The core tube assembly may comprise a single outer tube and a single inner tube.

Alternatively, the core tube assembly may comprise two or more than two axially aligned sections that are welded together at adjacent ends of the sections.

Preferably the core tube assembly is at least 4 m long.

More preferably the core tube assembly is at least 4 m long.

Preferably the core tube assembly has a minimum internal diameter of 80 mm.

Preferably the core tube assembly has a minimum external diameter of 120 mm.

Preferably the lance is a solids injection lance.

Preferably the lance is a solids injection lance for abrasive material.

Preferably the lance further comprises an annular water cooling jacket that extends over a substantial portion of the core tube assembly.

Preferably the cooling jacket has an internal diameter that is greater than the outer diameter of the core tube assembly such that there is a substantially annular clearance between the core tube assembly and the cooling jacket.

The present invention further provides a direct smelting plant that comprises a direct smelting vessel having at least one lance as described above.

The present invention further provides a direct smelting method for producing a molten metal form a metalliferous feed material that comprises injecting a solid feed material, such as the metalliferous feed material, into a direct smelting vessel via at least one lance as described above.

One example of a metalliferous feed material is iron ore, particularly iron ore fines.

In the case of iron pre injection, preferably the method comprises injecting the iron ore at a temperature of at least 600° C.

The present invention further provides a core tube assembly for a lance for injecting a solid material into a vessel, the core tube assembly comprising a passageway for solid material, the core tube assembly having an inlet and an outlet, the core tube assembly comprising an outer tube of a structural material and an inner tube of a wear resistant material that are bonded together.

The present invention further provides a method of manufacturing the core tube assembly described above that comprises the steps of:

(a) spin casting the outer tube of the structural material; and (b) spin casting the inner tube of the wear resistant material onto the inner surface of the outer tube, and (c) metallurgically bonding the tubes together.

BRIEF DESCRIPTION OF THE DRAWINGS

The present invention is described further by way of example only with reference to the accompanying drawings, of which:

FIG. 2 is a longitudinal partial cross-section view of a prior art solids injection lance for injecting ore into the vessel shown in FIG. 1;

FIG. 3 is a cross section view of a core tube assembly of one embodiment of a solids injection lance in accordance with the present invention; and FIG. 4 is an enlarged view of the forward end of the core tube assembly of FIG. 3.

DETAILED DESCRIPTION

Figure 1:
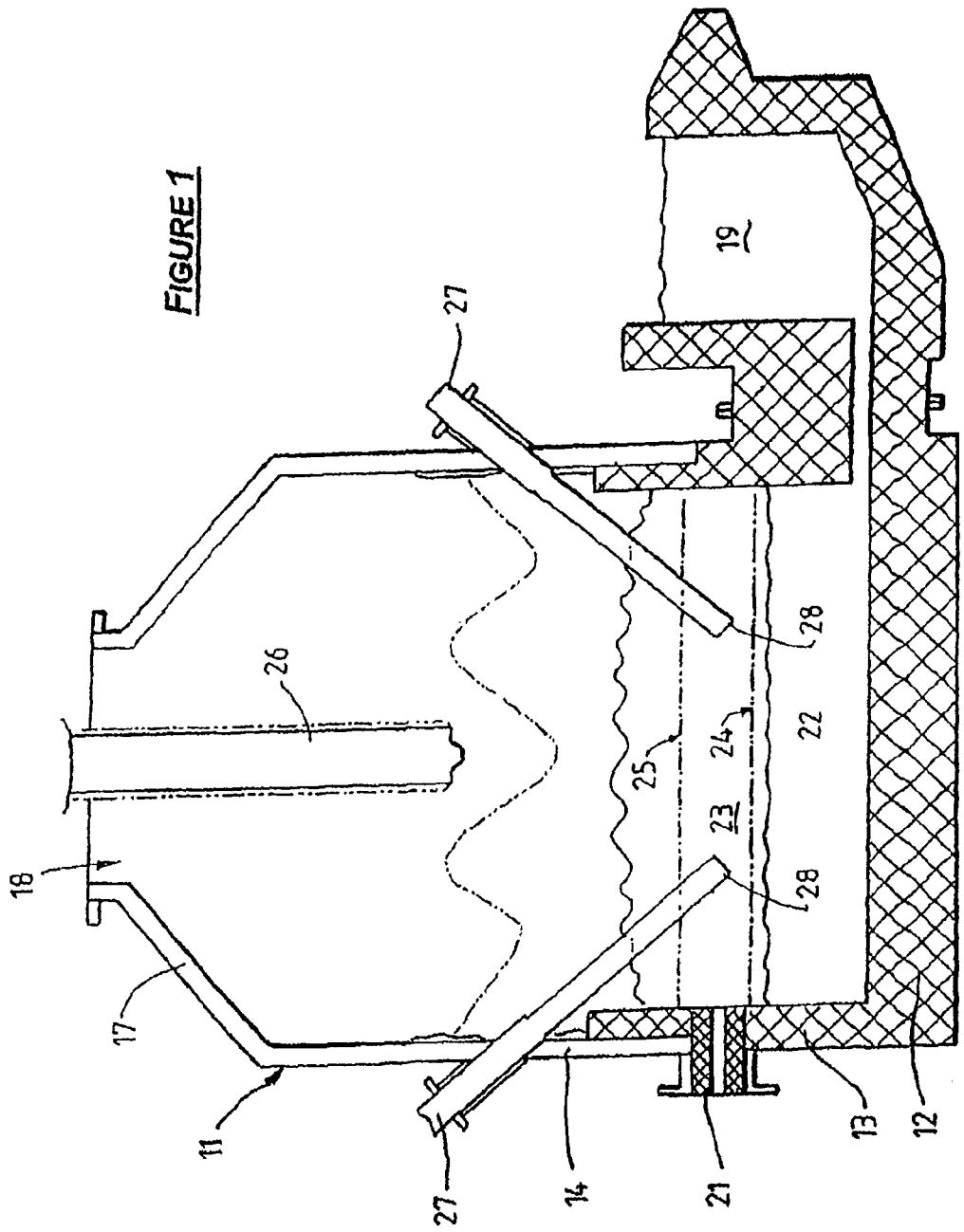
FIG. 1 is a vertical cross-section through a direct smelting vessel that includes a plurality of solids injection lances.

FIG. 1 shows a direct smelting vessel 11 that is suitable particularly for carrying out the HIsmelt process as described in International patent application PCT/AU96/00197. The following description is in the context of smelting iron ore fines to produce molten iron in accordance with the HIsmelt process. It will be appreciated that the present invention is applicable to smelting any metalliferous material, including ores, partly reduced ores, and metal-containing waste streams. It will also be appreciated that the ores can be in the form of iron ore fines. It will also be appreciated that the present invention is not confined to producing iron and extends to smelting other metals (including alloys).

The vessel 11 has a hearth that includes a base 12 and sides 13 formed from refractory bricks, side walls 14, which form a generally cylindrical barrel extending upwardly from the sides 13 of the hearth, and a roof 17. Water-cooled panels (not shown) are provided for transferring heat from the side walls 14 and also from the roof 17. The vessel 11 is further provided with a forehearth 19, through which molten metal is continuously discharged during smelting, and a tap-hole 21, through which molten slag is periodically discharged during smelting. The roof 17 is provided with an outlet 18 through which process off gases are discharged.

In use of the vessel 11 to smelt iron ore fines to produce molten iron in accordance with the HIsmelt process, the vessel 11 contains a molten bath of iron and slag, which includes a layer 22 of molten metal and a layer 23 of molten slag on the metal layer 22. The position of the nominal quiescent surface of the metal layer 22 is indicated by arrow 24. The position of the nominal quiescent surface of the slag layer 23 is indicated by arrow 25. The term "quiescent surface" is understood to mean the surface when there is no injection of gas and solids into the vessel 11.

The vessel 11 is provided with solids injection lances 27 that extend downwardly and inwardly through openings (not shown) in the side walls 14 of the vessel and into the slag layer 23. In use, iron ore fines and/or solid carbonaceous material (such as, for example, coal or coke breeze) and fluxes are entrained in a suitable carrier gas (such as an oxygen-deficient carrier gas, typically nitrogen) and injected through outlet ends 28 of the lances 27 into the metal layer 22.

The outlet ends 28 of the lances 27 are above the surface of the metal layer 22 during operation of the process. This position of the lances 27 reduces the risk of damage through contact with molten metal and also makes it possible to cool the lances by forced internal water cooling without significant risk of water coming into contact with the molten metal in the vessel 11.

The vessel 11 also has a gas injection lance 26 for delivering a hot air blast into an upper region of the vessel 11. The lance 26 extends downwardly through the roof 17 of the vessel 11 into the upper region of the vessel 11. In use, the lance 26 receives an oxygen-enriched hot air flow through a hot gas delivery duct (not shown), which extends from a hot gas supply station (also not shown).

FIG. 2 illustrates the general construction of a known prior art solids injection lance 27 disclosed in the above-mentioned U.S. Pat. No. 6,398,842 (assigned to the present applicant).

As shown in FIG. 2, the lance 27 comprises a core tube assembly 31 in the form of a tube that defines a passageway for solid material in the form of iron ore fines and/or carbonaceous material entrained in a suitable carrier gas to pass from an inlet end to a forward end 62 of the lance 27.

The lance 27 also comprises an annular cooling jacket 32 surrounding the core tube assembly 31 and extending over a substantial part of the length of the core tube assembly 31.

The annular cooling jacket 32 of the known lance 27 is in the form of a long hollow annular structure 41 having outer and inner tubes 42, 43 interconnected by a front end connector piece 44. An elongate tubular structure 45 is disposed within the hollow annular structure 41 so as to divide the interior of the structure 41 into an inner elongate annular water flow passage 46 and an outer elongate annular water flow passage 47.

The rear end (not shown) of the annular cooling jacket 32 of the known lance 27 is provided with a water inlet (also not shown) through which a flow of cooling water can be directed into the inner annular water flow passage 46 and a water outlet (also not shown) from which water is extracted from the outer annular passage 47 at the rear end of the lance 27. Accordingly, in use of the lance 27, cooling water flows forwardly down the lance through the inner annular water flow passage 46, radially outward through the connector piece 44, and then backwardly through the outer annular passage 47 along the lance 27. Thus, cooling water provides effective cooling of the lance 27 when exposed to the heat generated within the smelting vessel 11, when in use.

FIGS. 3 and 4 show a main part of a solids injection lance 27 according to an embodiment of the present invention. The solids injection lance 27 shown in FIGS. 3 and 4 comprises a core tube assembly 50. Whilst only partially shown in the Figures, the solids injection lance 27 also comprises an annular cooling jacket. FIG. 3 depicts a portion only of the front end connector piece 44 of the annular cooling jacket so as to indicate the outlet end of the core tube assembly 50.

The core tube assembly 50 shown in FIGS. 3 and 4 has a flange 52 provided at the rear end (indicated by arrow R) of the core tube assembly 50. The flange 52 facilitates connection of the core tube assembly 50 with other components of the solids injection lance 27 (not shown).

The core tube assembly 50 comprises three core tube sections 54a, 54b, 54c that are arranged axially in an end-to-end relationship and are welded together. Core tube section 54a is positioned at the rear end of the core tube assembly 50 and receives solid material. Core tube section 54c is positioned at the forward end of the core tube assembly 50 and delivers solid material into the vessel. Core tube section 54b is positioned between core tube sections 54a and 54c.

Each core tube section 54a, 54b, 54c comprises an outer tube section 56 of a structural material, such as a stainless steel, and an inner tube section 72 of a wear resistant material, such as a ferrochromium white cast iron. The inner and outer tube sections 56, 72 are bonded together metallurgically. Typically, the metallurgical bond is across the entire surface area of the interface between the tube sections. The adjacent ends of the outer tube sections 56 of the core tube sections 54a, 54b, 54c are welded together.

The outer tube sections 56 provide the structural requirements of the core tube assembly 50. The inner tube sections 72 provide the wear resistance requirements of the core tube assembly 50. Each tube section 56, 72 is formed to optimise the structural and the wear resistance requirements. The metallurgical bonding facilitates connecting together the core tube sections 54a, 54b, 54c and forming the core tube assembly 50.

Each core tube section 54a, 54b, 54c can be manufactured conveniently by spin casting the tubes by the following steps:
 (a) spin casting the stainless steel outer tube; and
 (b) spin casting the ferrochromium white cast iron inner tube onto the inner surface of the outer tube, and
 (c) metallurgically bonding the tubes together.

As indicated above, the solids injection lance 27 shown in part in FIGS. 3 and 4 also comprises an annular cooling jacket surrounding the core tube assembly 50 and extending over a substantial part of the length of the core tube assembly 50. The annular cooling jacket is not shown in FIGS. 3 and 4, save for the connector piece 44.

The annular cooling jacket 32 has the same basic structure as the annular cooling jacket 32 known lance shown in FIG. 2.

It is relevant to note that there is a small annular clearance (not shown), typically 2-4 mm, between the inner wall of the annular cooling jacket and the outer wall of the core tube assembly 50 to allow relative movement between these components and a purge gas to be delivered along the length thereof.

It is preferable that the core tube sections 54a, 54b, 54c be arranged such that the hollow cores 55 are aligned. Any misalignment of the core tubes 54a, 54b, 54c may result in increased wear occurring at the interface between adjacent core tube sections 54a, 54b, 54c, which will substantially reduce the service life of the core tube assembly 50.

In addition, it is preferable that the core tube sections 54 be straight such that the hollow cores 55 are also straight. Any curvature in the internal material flow path of the core tube assembly 50 may result in increased localized wear on a portion of one or more of core tube sections 54a, 54b, 54c. Again, such wear will substantially reduce the service life of the core tube assembly 50.

Many modifications may be made to the embodiments described above without departing from the spirit and scope of the present invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, any prior art publication referred to herein does not constitute an admission that the publication forms a part of the common general knowledge in the art, in Australia or any other country.

The invention claimed is:

1. A lance for injecting a solid material into a vessel or a direct smelting vessel for producing molten iron, the lance having a core tube assembly comprising a passageway for solid material, the core tube assembly having an inlet for receiving solid material at a rear end and an outlet for discharging material at a forward end, the core tube assembly comprising:
    (a) two or more than two axially aligned sections that are welded together at adjacent ends of the sections; and
    (b) an outer tube of stainless steel and an inner tube of white cast iron that are bonded together, wherein the bond between the outer tube and the inner tube is a metallurgical bond substantially across the whole of the surface area of the interface between the inner and outer tubes.

2. The lance defined in claim 1 wherein the outer tube is at least 3 mm thick.

3. The lance defined in claim 2 wherein the thickness of the outer tube is in the range of 3 mm to 15 mm.

4. The lance defined in claim 1 wherein the inner tube is formed from a ferrochromium white cast iron.

5. The lance defined in claim 4 wherein the white cast iron or ferrochromium white cast iron is at least 3 mm thick.

6. The lance defined in claim 5 wherein the white cast iron or ferrochromium white cast iron has a thickness in the range of 3 mm to 40 mm.

7. The lance defined in claim 1 wherein the metallurgical bond is formed by casting the inner tube onto an inner surface of the outer tube.

8. The lance defined in claim 1 wherein the core tube assembly comprises a single outer tube and a single inner tube.

9. The lance defined in claim 1 wherein the core tube assembly is at least 4 m long.

10. The lance defined in claim 1 wherein the core tube assembly has a minimum internal diameter of 80 mm.

11. The lance defined in claim 1 wherein the core tube assembly has a minimum external diameter of 120 mm.

12. The lance defined in claim 1 further comprises an annular water cooling jacket that extends over a substantial portion of the core tube assembly.

13. The lance defined in claim 12 wherein the cooling jacket has an internal diameter that is greater than the outer diameter of the core tube assembly
    such that a substantially annular clearance is provided between the core tube and the cooling jacket.

14. A direct smelting plant that comprises a direct smelting vessel having at least one lance defined in claim 1.

15. A direct smelting method for producing a molten metal from a metalliferous feed material comprising injecting a solid feed material or a metalliferous feed material, into a direct smelting vessel via at least one lance defined in claim 1.

16. A core tube assembly for a lance for injecting a solid material into a vessel, the core tube assembly comprising a passageway for solid material, the core tube assembly having an inlet and an outlet, the core tube assembly comprising:
    (a) two or more than two axially aligned sections that are welded together at adjacent ends of the sections; and
    (b) an outer tube of stainless steel and an inner tube of white cast iron that are bonded together, wherein the bond between the outer tube and the inner tube is a metallurgical bond substantially across the whole of the surface area of the interface between the inner and outer tubes.

17. The core tube assembly defined in claim 16 wherein the outer tube is at least 3 mm thick.

18. The core tube assembly defined in claim 17 wherein the thickness of the outer tube is in the range of 3 mm to 15 mm.

19. The core tube assembly defined in claim 16 wherein the inner tube is formed from a ferrochromium white cast iron.

20. The core tube assembly defined in claim 19 wherein the white cast iron or ferrochromium white cast iron is at least 3 mm thick.

21. The core tube assembly defined in claim 20 wherein the white cast iron or ferrochromium white cast iron has a thickness in the range of 3 mm to 40 mm.

22. The core tube assembly defined in claim 16 wherein the metallurgical bond is formed by casting the inner tube onto an inner surface of the outer tube.

23. The core tube assembly defined in claim 16 wherein the core tube assembly comprises a single outer tube and a single inner tube.

24. The core tube assembly defined in claim 16 wherein the core tube assembly is at least 4 m long.

25. The core tube assembly defined in claim 16 wherein the core tube assembly has a minimum internal diameter of 80 mm.

26. The core tube assembly defined in claim 16 wherein the core tube assembly has a minimum external diameter of 120 mm.

27. The core tube assembly defined in claim 16 further comprises an annular water cooling jacket that extends over a substantial portion of the core tube assembly.

28. The core tube assembly defined in claim 27 wherein the cooling jacket has an internal diameter that is greater than the outer diameter of the core tube assembly such that a substantially annular clearance is provided between the core tube assembly and the cooling jacket.

* * * * *

UNITED STATES PATENT AND TRADEMARK OFFICE
CERTIFICATE OF CORRECTION

PATENT NO. : 8,613,790 B2
APPLICATION NO. : 12/665190
DATED : December 24, 2013
INVENTOR(S) : Bronislaw Jerzy Minko It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 513 days.

Signed and Sealed this
Twenty-second Day of September, 2015

Michelle K. Lee
*Director of the United States Patent and Trademark Office*